United States Patent [19]

Walker et al.

[11] Patent Number: 4,495,013

[45] Date of Patent: Jan. 22, 1985

[54] APPARATUS AND METHOD FOR THE CONTINUOUS MANUFACTURE OF FOAM BOARD

[75] Inventors: Brian J. Walker, Cheshire; Victor F. Hodgson, Manchester, both of England

[73] Assignee: Imperial Chemical Industries PLC, London, England

[21] Appl. No.: 141,929

[22] Filed: Apr. 21, 1980

[30] Foreign Application Priority Data

May 31, 1979 [GB] United Kingdom ............... 7918923

[51] Int. Cl.³ ............................................. B32B 31/20
[52] U.S. Cl. ...................................... 156/79; 100/156; 100/168; 156/220; 156/582; 264/46.3; 425/337
[58] Field of Search ................. 100/93 RP, 156, 160, 100/168; 156/78, 79, 220, 582; 264/46.3; 425/335, 337

[56] References Cited

U.S. PATENT DOCUMENTS 4,019,938 4/1977 Forrester ........................... 156/78
4,127,066 11/1978 Sharkey ......................... 100/168 X Primary Examiner—Robert Dawson
Attorney, Agent, or Firm—Cushman, Darby & Cushman

[57] ABSTRACT

A plastic foam-forming mixture (31), e.g. a polyurethane or polyisocyanurate foam mix, deposited from one or more static dispensers (19) is metered through two spaced opposed members 14 and 18 forming between them a metering gap. At least one of the members is deformable in a controlled manner such that the profile of the metering gap can be variously defined. Reduces "crowning" of foam boards while permitting foam boards of different thicknesses to be made without having to replace metering bars.

7 Claims, 6 Drawing Figures

APPARATUS AND METHOD FOR THE CONTINUOUS MANUFACTURE OF FOAM BOARD

This invention relates to the continuous manufacture of foam board of the type having a core of plastics foam, especially polyurethane or polyisocyanurate foam, sandwiched between two flexible facing sheets.

Machines suitable for the continuous manufacture of such boards are well known. Generally they consist of a conveyor system for transporting two continuous webs of sheet material fed from supply rolls through a series of operating stations to a point of delivery of a finished foam board, and a foam dispensing unit for applying a self-foaming plastics mixture to one or both facing sheets, normally the lower sheet. If the foam is deposited from a static dispenser a metering device comprising, for example, two closely spaced parallel rollers, is usually provided to cause the facing sheets to converge into proximate relationship with the foam mix sandwiched between them, the mix being distributed across the width of the sheets as the sheets converge and pass through the nip of the metering device. An expansion zone follows in which the foam is allowed to rise, usually under the accelerating influence of heat and usually under light pressure exerted on the upper sheet to prevent delamination caused by gas generated during foaming. After foaming is substantially complete the laminate is transported through a longitudinal gap formed between two spaced, parallel conveyors backed by platens where the foam is cured. On emerging from the gap the side edges of the laminate are trimmed and the laminate is cut into desired lengths.

Various modifications and auxiliary devices have been proposed and used over the years to improve the quality of the product and speed production.

The present invention is concerned with the problem of metering the foam mix and uniformly distributing it between the facing sheets.

As already mentioned one kind of metering device in use comprises two closely spaced parallel rollers. The space can be adjusted to meter and spread a quantity of foam mix appropriate to the thickness of board being made. In our experience we have found this type of metering device unsatisfactory because instead of giving parallel-faced boards as could be expected, in practice, the boards produced tend to be crowned.

According to the present invention we provide an apparatus for the continuous manufacture of foam board having a plastics foam core sandwiched between flexible facing sheets which comprises a conveyor assembly for continuously advancing upper and lower facing sheets in spaced opposed transversely-parallel disposition; a foam dispenser for depositing a liquid mixture of plastics foam-forming ingredients onto at least one of the facing sheets; a metering device for causing the facing sheets to converge into proximate relationshp; and zones for the expansion and curing of the foam laminate; the metering device comprising two spaced opposed foam-constricting members forming therebetween a metering gap, at least one of the members being deformable in a controlled manner such that the profile of the metering gap can be variously defined.

While not wishing to be bound by any particular theory, it is believed that the crowning effect encountered with laminates made on previously known machines having parallel metering rollers is caused by pressure induced in the foam mix by the "nip" action of the facing papers as they converge to pass through the metering rollers. This pressure is higher than the central portion of the laminate being formed causing more foam mix to pass through the centre of the metering gap than at the sides. Hence the foam core is thicker at the centre. To overcome this defect one or both of the metering rolls can be profiled to give a reduced gap in the centre to counteract the pressure effect. However the actual shape of the metering gap is likely to be different for each product thickness that is manufactured. It is an advantage of the present invention that it permits foam boards of different thicknesses to be made without having to change rollers.

In one embodiment of the present invention the foam-constricting members comprise a lower rigid roller and an upper resilient cylindrical steel bar which can be deformed by flexing in a controlled manner.

Controlled flexing may be achieved, for instance, by screw-jacks located along the length of the bar which act against a more rigid structure. In a preferred mechanism the bar is suspended from a series of screw assemblies which are attached to a substantial beam. Each screw assembly comprises a bolt having a first threaded section at one end which screws into the bar and a second threaded section towards the other end which turns in a collar fixed to the beam. The two threads are of the same hand but different pitch so that the bar moves relative to the beam as the bolts of the screw assemblies are turned. Appropriate adjustment enables the bar to be flexed to give the desired profile. Deformation of the bar may be measured, for example, by a series of dial gauges. If the pitches of the threads are only slightly different the bar can be adjusted finely. Adjustment of the metering gap without affecting the profile of the bar can be obtained by mounting the beam at each end on screw-jack assemblies or the like.

The lower metering roller may be a cylindrical roller or cylindrical static bar. The bars need not necessarily be cylindrical or of steel. Bars of other curved cross-sections may equally be suitable as may other materials of construction. It is important only that the constricting members cannot be deformed significantly by pressure exerted by the foam mix and that the profile of the metering gap can be varied according to the thickness of the foam board to be produced to regulate the quantity of foam distributed across the width of the papers such that a product with parallel faces is obtained and any crowning effect eliminated.

The lower member may also be profiled to overcome a further problem, namely thinning of the foam board close to the edges of the board which is additional to the crowning effect. Thus the lower metering member, if it is cylindrical, may have its diameter reduced near its end to increase the amount of foam mix layed down in these regions.

Furthermore, the lower member may itself be deformable to cater for different degrees of thinning at the edges of the foam board to be produced. It may be of a type similar to that hereinbefore described for the upper member.

To protect one or both of the constricting members against excessive wear and to keep their surfaces clean they may be covered with a thin robust film. The film should be smooth and of even thickness; it should be reasonably strong and have reasonable wear properties. Frictional properties are not crucial although a high friction coefficient could give rise to difficulties. "Melinex" (Registered Trade Mark) polyester film has been found suitable. When used to cover a static member it is desirable to index the film, i.e. present fresh surfaces to the member and facing sheet periodically, for example, every 15 to 20 minutes. This can be done by mounting a roll of the film on a shaft fitted with an indexing device which is periodically operated while the machine is running to allow a short length of 2 to 3 cm to be drawn through the metering gap in register with the contiguous facing sheet. A take-up reel driven by a small air motor can provide the necessary torque to keep the film reasonably taut.

The extent to which the constricting member or members need to be deformed depends on a number of factors. When two parallel rigid metering rollers set at a gap of about 1.3 mm are used to make 1.2 m wide board using 0.27 mm thick paper facings, a polyurethane foam board typically has been found to show a 7% reduction in thickness at 30 cm from the central crown and 16% at 50 cm from the central crown. Thus, bearing in mind that the foam-mix expands thirty to fortyfold, the constricting members of the present invention will need to be deformed accordingly by narrowing the metering gap toward its centre.

However, other factors come into play. These include inter alia the inclination of any supporting platens anterior to the foam-constricting members and the thickness of foam board to be produced.

Preferably upper and lower rigid platens, acutely angled to each other in a longitudinal direction, and anterior to the foam-constricting members, form part of the metering device to support the converging facing sheets and assist in spreading a bank of deposited foam mix across the width of the sheets. The inclination of these supporting platens will normally be adjustable to an angle of less that 10°. The actual angle at which the platens are set will depend on the foam ingredients used. For example, we have found that with certain polyurethane foams an angle of 5° to 6° is optimum and with certain isocyanurate foams 2½°. Conveniently in-feed rollers are mounted in front of the platens to take the facing sheets across the platen surfaces. In practice, the surfaces of the platens are parallel to but slightly distanced (by about 1 mm) behind the imaginary tangential lines joining the respective in-feed rollers and metering members. This is to ensure that the facings are maintained in full contact with the metering members so as not to distort the metering gap. It is especially important where the facings converge at relatively small angles and protrusion of a platen beyond a tangential line could prevent contact of one of the facing sheets with its metering member. To keep the cover sheets flat and free from folds and wrinkles the platens are foraminated and connected to a 'vacuum' supply.

Ideally the platens support the facing sheets as close as possible up to the metering gap otherwise the pressure of the foam-mix may cause the facing sheets to bulge in unsupported areas. Variations in paper tension caused thereby can influence the liquid pressure immediately behind the metering gap resulting in foam thickness variations and unstable operating conditions.

The volume of foam-mix which forms in a bank behind the metering gap is governed by the inclination of the supporting platens, the volume of the bank being smaller as the platens are more acutely angled. An advantage of using a small angle is that there is less risk of foam starting to react or "cream" before it has passed through the metering gap. Creaming is to be avoided as it reduces the density of the foam-mix resulting in laminates with a deficiency of foam at the edges. However, a disadvantage of the small angle is that the crowning effect is accentuated. The more acutely inclined the supporting platens, the greater the pressure induced at the centre of the nip (presumably since it becomes more difficult for the foam mix to move laterally) and the greater the crowning effect. While the present invention overcomes the crowning effect, in practice, the angle at which the supporting platens are set is a compromise, being the largest angle at which creaming is avoided with a particular foam system.

Advantageously one or both of the supporting platens are shaped across their width so that their surfaces are farthest apart at the centre, becoming closer towards the edges. This has the effect of reducing the pressure differential of the foam-mix across the width and assists the deformable constricting member or members in eliminating the crowning effect. Suitably both platens are bowed so that transversely the space between them has a barrel-shaped profile. Shaping the leading edges of the supporting platens has the most telling effect.

For the manufacture of very thin boards the use of bowed platens may be sufficient to eliminate the crowning effect with the constricting members maintained parallel to each other.

Other features of the apparatus may be those conventionally used on machines for the continuous manufacture of foam boards. Thus, for example, the laminating machine described in the article entitled "A New Development Machine for the Continuous Lamination of Rigid Urethane Foam" published in Rubber and Plastic Age, Volume 47 (1966), No. 1, page 57 may be modified to incorporate the metering device of the present invention which will normally be used in conjunction with one or more static dispensers replacing the more cumbersome and, in many ways, the operationally and environmentally less attractive reciprocating spray head. We have found that for, at least, 1.2 m wide foam board three single static heads placed symetrically across the width of the lower supporting platen or lay-down table enables a satisfactory product to be obtained.

The expansion zone, which may be a heated chamber, is usefully provided with a longitudinally flexible belt or drape for maintaining a light pressure on the top surface of the laminate during foam rise.

The favoured curing zone is described in more detail in our British Patent Specification No. 1075401 in which a "floating-platen" exerts a predetermined constant pressure on the foam core during the curing period.

One advantage of the present invention is that foam board can be made at higher speed and with less contamination than a laminator equipped only with a transversely reciprocating spray head. Another advantage is that it provides a convenient way of obtaining foam board having parallel faces for different thicknesses of board and permits fine adjustment of the cross-sectional profile of the board during a production run. Yet another advantage is that foam-forming mixtures having a relatively short "cream-time" can be processed.

In another aspect of the invention we provide a method for the manufacture of foam board consisting of a core of plastics foam, especially polyurethane or polyisocyanurate foam, sandwiched between two flexible facing sheets, the process comprising continuously advancing upper and lower facing sheets in spaced opposed transversely parallel disposition; depositing a liquid mixture of plastics foam-forming ingredients onto at least one of the facing sheets, usually the lower sheet, bringing the sheets into proximate relationship so that both sheets contact the foam-forming mixture; passing the sheets between foam-constricting members which form therebetween a metering gap so that the foam mixture is spread across the width of the sheets and fully occupies the space therebetween; and thereafter transporting the facing sheets while allowing the foam-mixture to expand and cure; the profile of the metering gap being adjusted by deforming in a controlled manner at least one of the constricting members to obtain a desired, usually uniform, distribution of the foam-mixture across the width of the sheets.

The invention also includes the foam boards so produced.

The foam boards of most interest to us have a rigid plastics foam core which may be formed from any suitable plastics foam-forming composition. The invention may, however, have application to flexible foams. Of especial interest are foam cores consisting of an isocyanate-based foam material. Suitable isocyanate-based foams include polyurethane foams obtained in known manner from a suitable mixture of polyurethane-forming ingredients such as polyesters or polyethers and polyisocyanates with water, catalysts, surfactants, blowing agents and other ingredients. Suitable isocyanate-based foams also include polymeric foams containing an isocyanurate ring structure which may be obtained by treating an organic polyisocyanate with an isocyanate-polymerising catalyst, a blowing agent, and optionally, a deficiency, based on the isocyanate groups present, of an active hydrogen-containing compound. These foams and their method of preparation are well documented in the literature and are well known to the skilled worker in this field. The facing materials may be composed of continuous or semi-continuous lengths of any suitable material such as paper, plastics, metal, rubber or paperboard.

By way of illustration only a description of an apparatus and method, which are embodiments of this invention, will now be given with reference to the accompanying drawings in which.

Figure 1:
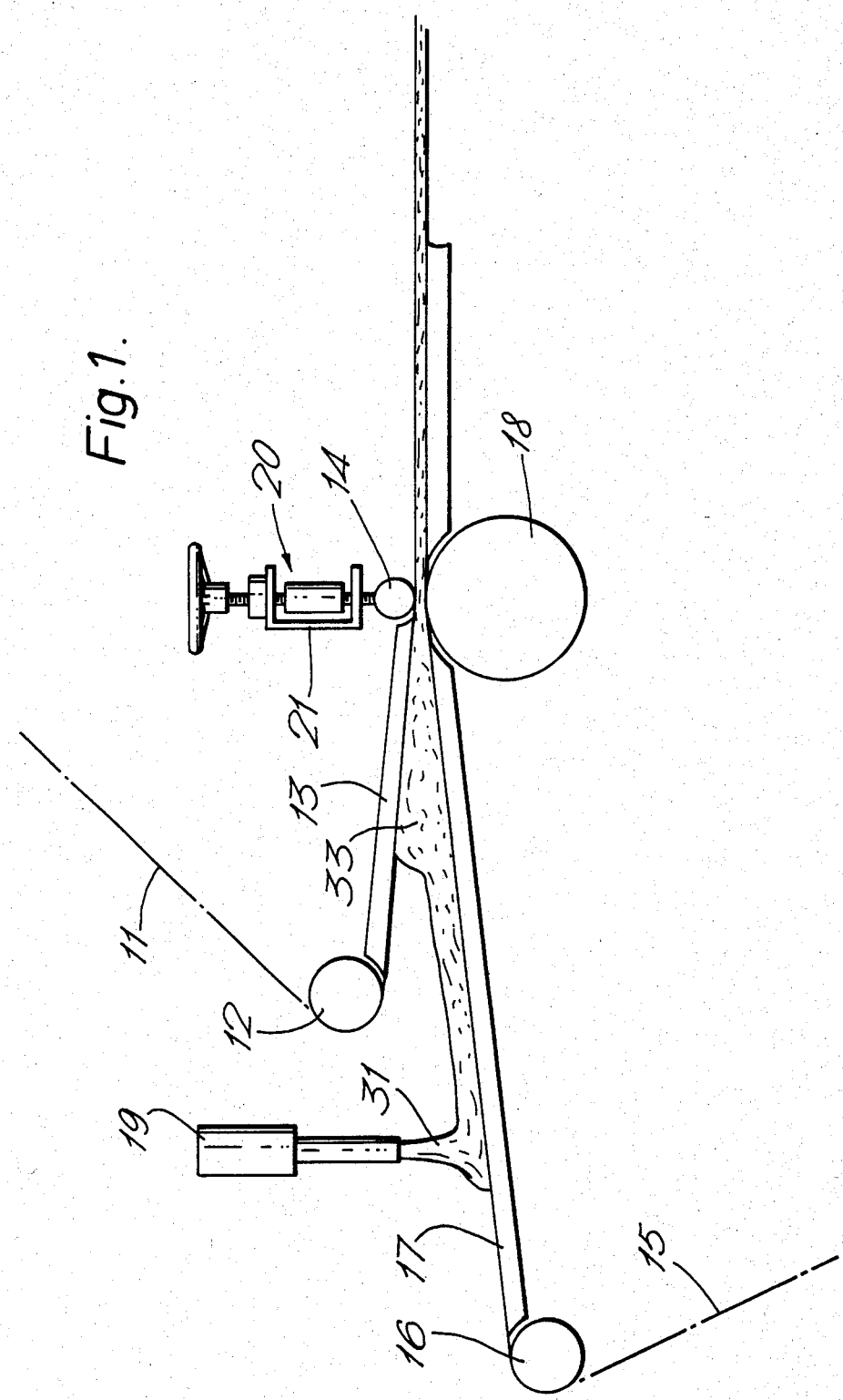
FIG. 1 is a diagrammatic, side elevational view of part of a foam board production machine incorporating the invention.

In the drawings, an upper paper web 11 fed from a first spool (not shown) passes around an in-feed roller 12, across a flat upper supporting platen 13 and over a first steel cylindrical bar 14 before being transported by a conveyor assembly through expansion and curing zones (not shown). A lower paper web 15 fed from a second spool (not shown) passes around an in-feed roller 16, across a lower supporting platen 17, hereinafter referred to as a laydown table, and over a second steel cylindrical bar 18 of larger diameter than the first, before being transported with and in similar manner to the upper web. The platen 13 and laydown table 17 are foraminated and connected to a 'vacuum' source (not shown). Three static combined mixing heads and dispensers (only one of which, 19, is shown for simplicity) are positioned symetrically across the width of the lower paper web and are connected to supplies of foam-forming ingredients (not shown).

The bar 14 is suspended from a series of screw assemblies 20 attached to a rolled steel beam 21. The screw assemblies comprise a bolt 22 having a first threaded section 23 for screwing into the bar 14 and a second threaded section 24 for turning in a collar 25 integral with the beam 21. The two threads are of the same hand but of slightly different pitch; the first threaded section 23 having the shallower pitch. Dial gauges 26 measure the deflection of the bar 14. The beam 21 is mounted at each end on accurate screw-jack assemblies (not shown).

Figure 2:
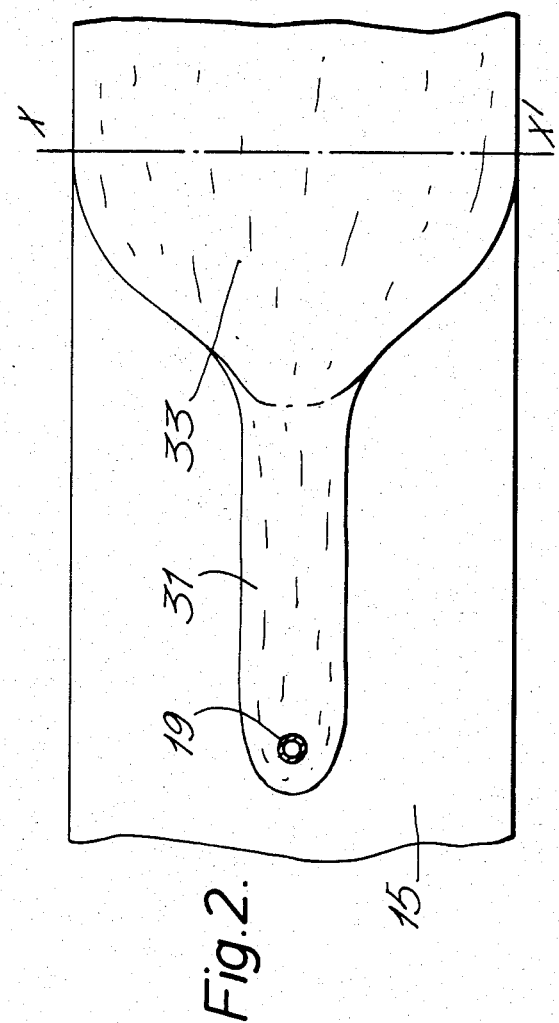
FIG. 2 is a diagrammatic plan view of part of the same machine illustrated in FIG. 1 showing the pattern of spreading of a foam-forming mixture used with the machine.
Figure 3:
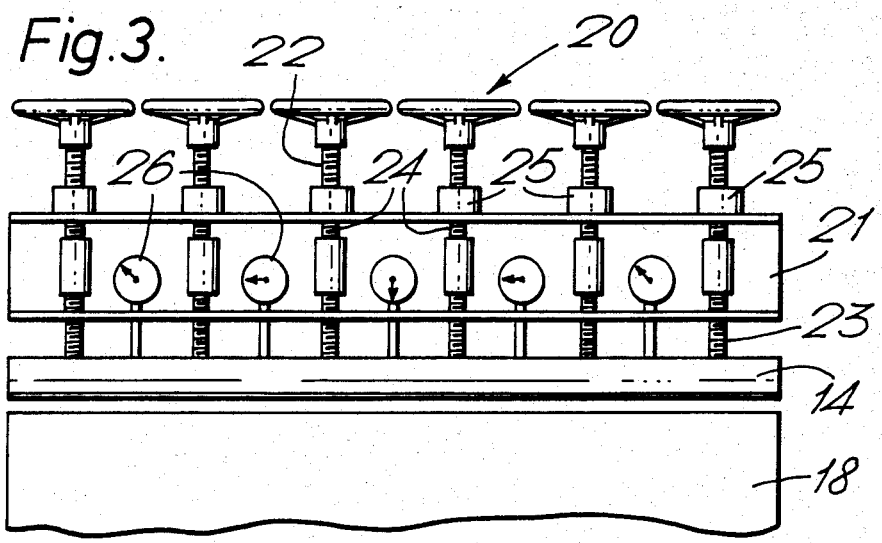
FIG. 3 is a diagrammatic end elevational view of a foam metering device used on the machine illustrated in FIG. 1.
Figure 4:
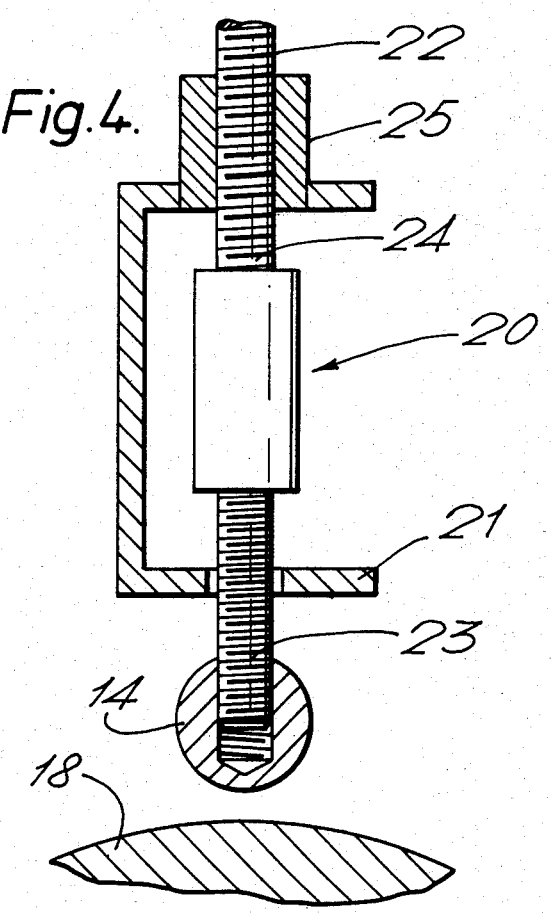
FIG. 4 is a diametral section of a detail from FIG. 1 of the same metering device in side elevation.

In operation, a plastics foam-forming mixture, in this particular case a rigid polyurethane foam mix 31, is deposited from the dispenser 19 onto the advancing lower paper web 15. The simultaneously advancing paper web 11 is brought into contact with the foam mix which forms a bank 33 between the converging platens 13 and 17 and the bank of foam is spread across the width of the paper webs in the pattern shown in FIG. 2. In FIG. 2, the line X—X' indicates the position of the metering gap. The angle of inclination of the laydown table and upper platen is adjusted by tilting either or both the table or upper platen (for small adjustments usually only the upper platen) to give the largest angle at which creaming of the foam mix is avoided. The beam 21 having been raised or lowered to suit the particular thickness of foam board being made, the screw assemblies are individually adjusted to flex the steel bar 14 to obtain a foam board having parallel faces. Fine adjustments can be made during operation to allow for changing conditions. The deformation of the bar is measured on the dial gauges.

Figure 5:
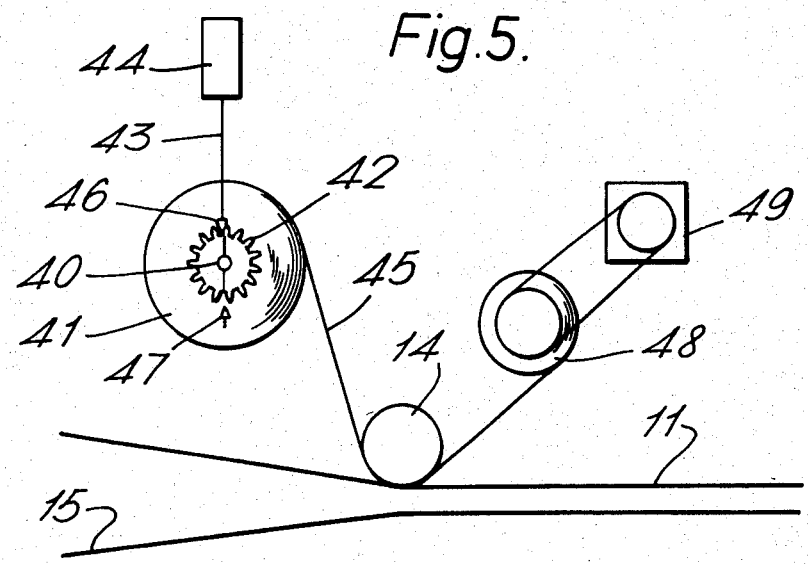
FIG. 5 is a diagrammatic side elevational view of an auxiliary film-feeding device for fitting to the machine illustrated in FIG. 1.

To protect one or both of the bars 14 and 18 the bars may be covered with a thin film fed from an auxiliary device such as that shown in FIG. 5.

In FIG. 5, a web of "Melinex" (Registered Trade Mark) polyester film 45 is supplied from a feed roll 41 mounted on a shaft 40 which is provided at one end with an indexing mechanism comprising a gear wheel 42 having an odd number of teeth and pawls 46 and 47 mounted on a rod 43. The rod 43 is connected to a pneumatic cylinder 44 which is controlled by a timing circuit (not shown). A film take-up reel 48 is powered by an air motor 49.

In operation, the timing circuit is set to a desired time interval, say 15 to 20 minutes, at the end of which the pneumatic cylinder 44 actuates the rod 43 which disengages the pawl 46 from, and simultaneously engages the pawl 47 with, the gear wheel 42 allowing the feed roll 41 to rotate a few degrees on shaft 40. The roll rotates by virtue of the tension on the film 45 induced by the fictional drag of the paper web 11 at the point of contact with the bar 14 and the torque on the take up reel 48 applied by air motor 49. Thus the film moves in register with the paper web to present a fresh surface for a further time interval.

Figure 6:
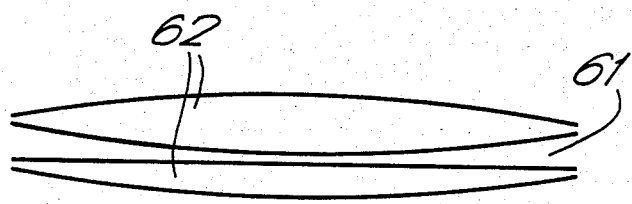
FIG. 6 is an end elevational view of part of the metering device of the machine illustrated in FIG. 1 showing schematically the profile of the metering gap and of the leading edges of modified supporting platens.

In a modified machine, especially useful for making thin boards, upper platen 13 and laydown table 17 are transversely bowed. FIG. 6 shows the gap 61 formed by the metering bars 14 and 18 superimposed on the gap 62 formed by the leading edges of the upper platen and laydown table.

Commonly known modifications and refinements used on other continuous laminating machines may be incorporated, as appropriate, in the machine herein described.

While the machine has been described with reference to the production of parallel-faced foam boards, it will be appreciated that it may be advantageously employed for the manufacture of variously shaped, e.g. transversely tapering, boards by appropriate adjustment of one or more of the controllably deformable metering bars.

We claim:

1. Apparatus for the continuous manufacture of foam board having a plastics foam core sandwiched between flexible facing sheets which comprises a conveyor assembly for continuously advancing upper and lower facing sheets in spaced opposed transversely-parallel disposition; a foam dispenser for depositing a liquid mixture of plastics foam-forming ingredients onto at least one of the facing sheets; a metering device for causing the facing sheets to converge into proximate relationship; and zones for the expansion and curing of the foam laminate; the metering device comprising two spaced opposed foam-constricting members forming therebetween a metering gap, at least one of the members being deformable in a controlled manner such that the profile of the metering gap can be variously defined.

2. Apparatus as claimed in claim 1 in which the foam-constricting members comprise a lower rigid roller and an upper resilient cylincrical steel bar which can be deformed by flexing in a controlled manner.

3. Apparatus as claimed in claim 2 in which the steel bar is suspended from a series of screw assemblies which are attached to a substantial beam, each screw assembly comprising a bolt having a first threaded section at one end which screws into the bar and a second threaded section towards the other end which turns in a collar fixed to the beam, the two threads being of the same hand but different pitch so that the bar moves relative to the beam as the bolts of the screw assemblies are turned.

4. Apparatus as claimed in claim 1 in which upper and lower rigid platens, acutely angled to each other in a longitudinal direction, and anterior to the foam-constricting members, form part of the metering device to support the converging facing sheets and assist in spreading a bank of deposited foam mix across the width of the sheets.

5. Apparatus as claimed in claim 4 in which the inclination of the supporting platens to each other is adjustable to an angle of less than 10°.

6. Apparatus as claimed in claim 4 in which one or both of the supporting platens are shaped across their width so that their surfaces are farthest apart at the centre, becoming closer towards the edges.

7. Method for the manufacture of foam board consisting of a core of plastics foam, especially polyurethane or polyisocyanurate foam, sandwiched between two flexible facing sheets, the process comprising continuously advancing upper and lower facing sheets in spaced opposed transversely parallel disposition; depositing a liquid mixture of plastics foam-forming ingredients onto at least one of the facing sheets, usually the lower sheet, bringing the sheets into proximate relationship so that both sheets contact the foam-forming mixture; passing the sheets between foam-constricting members which form therebetween a metering gap so that the foam mixture is spread across the width of the sheets and fully occupies the space therebetween; and thereafter transporting the facing sheets while allowing the foam-mixture to expand and cure; the profile of the metering gap being adjusted by deforming in a controlled manner at least one of the constricting members to obtain a desired, usually uniform, distribution of the foam-mixture across the width of the sheets.

* * * * *